(12) United States Patent (10) Patent No.: US 8,630,247 B2
Kamalaraj et al. (45) Date of Patent: Jan. 14, 2014

(54) SYSTEM AND METHOD FOR MANAGING TRACKING AREA IDENTITY LISTS IN A MOBILE NETWORK ENVIRONMENT

(75) Inventors: Vinod K. Kamalaraj, Shirley, MA (US); Jacob Eipe, Nashua, NH (US); Pradeep K. Dakshayani Raghavan, Hudson, NH (US)

(73) Assignee: Cisco Technology, Inc., San Jose, CA (US)

( * ) Notice: Subject to any disclaimer, the term of this patent is extended or adjusted under 35 U.S.C. 154(b) by 364 days.

(21) Appl. No.: 13/027,999

(22) Filed: Feb. 15, 2011

(65) Prior Publication Data

US 2012/0207013 A1    Aug. 16, 2012

(51) Int. Cl.
    *H04W 4/00*    (2009.01)
(52) U.S. Cl.
    USPC ........... 370/329; 370/338; 370/401; 455/450; 455/509
(58) Field of Classification Search
    None
    See application file for complete search history.

(56) References Cited

U.S. PATENT DOCUMENTS

| 7,215,667 | B1 | 5/2007 | Davis |
| 8,000,242 | B2 | 8/2011 | Wang et al. |
| 8,355,413 | B2 | 1/2013 | Vasamsetti et al. |
| 8,358,593 | B2* | 1/2013 | Eipe et al. ............... 370/254 |
| 8,493,860 | B2 | 7/2013 | Racz et al. |
| 2005/0041584 | A1 | 2/2005 | Leu et al. |
| 2005/0138418 | A1 | 6/2005 | Spry et al. |
| 2005/0159167 | A1 | 7/2005 | Hakalin et al. |
| 2006/0159016 | A1 | 7/2006 | Sagfors et al. |
| 2007/0064684 | A1 | 3/2007 | Kottilingal |
| 2007/0105549 | A1 | 5/2007 | Suda et al. |
| 2007/0189268 | A1 | 8/2007 | Mitra et al. |
| 2008/0049787 | A1 | 2/2008 | McNaughton et al. |
| 2008/0144496 | A1 | 6/2008 | Bachmutsky |
| 2008/0144502 | A1 | 6/2008 | Jackowski et al. |
| 2009/0268684 | A1 | 10/2009 | Lott et al. |
| 2009/0296599 | A1 | 12/2009 | Ayyagari et al. |
| 2010/0002722 | A1 | 1/2010 | Porat et al. |
| 2010/0246432 | A1 | 9/2010 | Zhang et al. |
| 2010/0322141 | A1 | 12/2010 | Liu et al. |
| 2011/0098031 | A1* | 4/2011 | Dakshayani et al. ...... 455/422.1 |
| 2011/0098051 | A1* | 4/2011 | Kamalaraj et al. ........... 455/450 |
| 2011/0111767 | A1 | 5/2011 | Livanos ............... 455/452.2 |
| 2011/0117931 | A1* | 5/2011 | Hu et al. .................. 455/456.1 |
| 2011/0141884 | A1* | 6/2011 | Olsson et al. .............. 370/225 |

(Continued)

OTHER PUBLICATIONS

U.S. Appl. No. 13/027,970, filed Feb. 15, 2011, entitled "System and Method for Synchronizing Quality of Service in a Wireless Network Environment," Inventors: Mark Grayson, et al.

(Continued)

*Primary Examiner* — Chi Pham
*Assistant Examiner* — Shick Hom
(74) *Attorney, Agent, or Firm* — Patent Capital Group

(57) ABSTRACT

A method is provided in one example embodiment and includes communicating a plurality of queries associated with common tracking areas in a wireless network; identifying a set of serving gateways that serve the common tracking areas; generating a tracking area identity (TAI) list to be used in provisioning network resources for user equipment; and selecting a first serving gateway from the set of serving gateways for the user equipment, wherein the first serving gateway is selected based on the common tracking areas served by the set of serving gateways. In more specific embodiments, the queries are domain name system (DNS) queries that are supported by a network element and that have no cached DNS response.

20 Claims, 5 Drawing Sheets

(56) References Cited

U.S. PATENT DOCUMENTS

| 2011/0235528 | A1 | 9/2011 | Racz et al. | |
|---|---|---|---|---|
| 2011/0292870 | A1 | 12/2011 | Nagpal et al. | |
| 2012/0026884 | A1* | 2/2012 | Sundell et al. | 370/235 |
| 2012/0047273 | A1 | 2/2012 | Ajero et al. | |
| 2012/0269064 | A1 | 10/2012 | Strasman | |

OTHER PUBLICATIONS

U.S. Appl. No. 13/104,788, filed May 10, 2011, entitled "System and Method for Integrated Quality of Service in a Wireless Network Environment," Inventors: Kevin D. Shatzkamer.

U.S. Appl. No. 13/179,537, filed Jul. 10, 2011, entitled "System and Method for Subscriber Mobility in a Cable Network Environment," Inventors: Kevin D. Shatzkamer, et al.

U.S. Appl. No. 13/021,125, filed Feb. 4, 2011, entitled "System and Method for Managing Congestion in a Network Environment," Inventors: Francois L. Le Faucheur, et al.

P. Eardley, "Pre-Congestion Notification (PCN) Architecture," Network Working Group, RFC 5559, Jun. 2009, 51 pages; eprints.eemcs.utwente.nl/15444/01/rfc5559.txt.

Francois Le Faucheur, et al., "RSVP Extensions for Admission Control Over Diffserv Using Pre-Congestion Notification (PCN)," Internet Draft, © The Internet Society (2006), 11 pages; tools.ietf.org/pdf/draft-lefaucheur-rsvp-ecn-01.pdf.

Wayne Cutler, "MSF Whitepaper on Quality of Service (QoS) over the Network-to-Network Interface (NNI)—MSF-TR-Services-006.Final," MultiService Forum © 2010, 22 pages.

ETSI, "LTE; General Packet Radio Service (GPRS) enhancements for Evolved Universal Terrestrial Radio Access Network (E-UTRAN) access (3GPP TS 23.401 version 9.6.0 Release 9)," © European Telecommunications Standards Institute 2010; 262 pages.

USPTO Mar. 7, 2013 Non-Final Office Action from U.S. Appl. No. 13/027,970.

USPTO Apr. 16, 2013 Response to Non-Final Office Action dated Jan. 24, 2013 from U.S. Appl. No. 13/104,788.

U.S. Appl. No. 13/591,069, filed Aug. 21, 2012, entitled "Providing Integrated End-to-End Architecture That Includes Quality of Service Transport for Tunneled Traffic," Inventors: Mark Grayson, et al.

USPTO Jan. 24, 2013 Non-Final Office Action from U.S. Appl. No. 13/104,788.

O'Dell, Mike, "8+8—An Alternate Addressing Architecture for IPv6," Network Working Group Internet Draft <draft-odell-8+8-00.txt> UUNET Technologies, Oct. 22, 1996, 21 pages.

Subharthi, Paul, et al., "A Vision of the Next Generation Internet: A Policy Oriented Perspective," Proceedings of British Computer Society (BCS) International Conference on Visions of Computer Science, Imperial College, Long, Sep. 22-24, 2008, 12 pages.

Zorn, G., et al., "RADIUS Attributes for Tunnel Protocol Support," Network Working Group RFC 2868, Jun. 2000, 21 pages.

"Data-over-Cable Service Interface Specifications DOCSIS 3.0; MAC and Upper Layer Protocols Interface Specification," Feb. 15, 2008.

Kent, et al., "Security Architecture for the Internet Protocol," Network Working Group, IETF RFC 2401; Nov. 1998.

USPTO Jun. 7, 2013 Response to Mar. 7, 2013 Non-Final Office Action from U.S. Appl. No. 13/027,970.

USPTO Jul. 16, 2013 Final Office Action from U.S. Appl. No. 13/027,970.

USPTO Jun. 7, 2013 Final Office Action from U.S. Appl. No. 13/104,788.

USPTO Jun. 18, 2013 Non-Final Office Action from U.S. Appl. No. 13/021,125.

USPTO Jul. 26, 2013 Non-Final Office Action from U.S. Appl. No. 13/179,537.

USPTO Oct. 9, 2013 Request for Continued Examination Response to Jul. 16, 2013 Final Office Action from U.S. Appl. No. 13/027,970.

USPTO Oct. 31, 2013 Non-Final Office Action from U.S. Appl. No. 13/027,970.

USPTO Aug. 13, 2013 Response to Jun. 18, 2013 Non-Final Office Action from U.S. Appl. No. 13/021,125.

USPTO Oct. 24, 2013 Final Office Action from U.S. Appl. No. 13/021,125.

USPTO Oct. 16, 2013 Response to Jul. 26, 2013 Non-Final Office Action from U.S. Appl. No. 13/179,537.

* cited by examiner

SYSTEM AND METHOD FOR MANAGING TRACKING AREA IDENTITY LISTS IN A MOBILE NETWORK ENVIRONMENT

TECHNICAL FIELD

This disclosure relates in general to the field of communications, and more particularly, to a system and a method for managing tracking area identity lists in a mobile network environment.

BACKGROUND

Networking architectures have grown increasingly complex in communications environments, particularly mobile wireless environments. Mobile data traffic has grown extensively in recent years, which has significantly increased the demands on radio resources. As the subscriber base of end users increases, efficient management of communication resources becomes even more critical. In some instances, failure of a network element may cause user equipment to detach and then reattach to the network, which may waste valuable radio resources and potentially create overload conditions in other network elements. Hence, there is a significant challenge in managing radio resources, particularly when certain network elements fail.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes communicating a plurality of queries associated with common tracking areas in a wireless network; identifying a set of serving gateways that serve the common tracking areas; generating a tracking area identity (TAI) list to be used in provisioning network resources for user equipment; and selecting a first serving gateway from the set of serving gateways for the user equipment, wherein the first serving gateway is selected based on the common tracking areas served by the set of serving gateways. In more specific embodiments, the queries are domain name system (DNS) queries that are supported by a network element and that have no cached DNS response.

In other instances, example embodiments of the present disclosure may include relocating the user equipment to a second serving gateway in the set of serving gateways without detaching the user equipment. In other cases, the method can include relocating the user equipment to a second serving gateway in the set of serving gateways in response to a failure of the first serving gateway. A weight factor can be calculated for each common tracking area, the weight factor being representative of a number of eNodeBs that are not in an eNodeB group of the user equipment's current tracking area identity (TAI). Assigned tracking areas can be determined by selecting the common tracking areas having lower weight factors.

Example Embodiments

Figure 1:
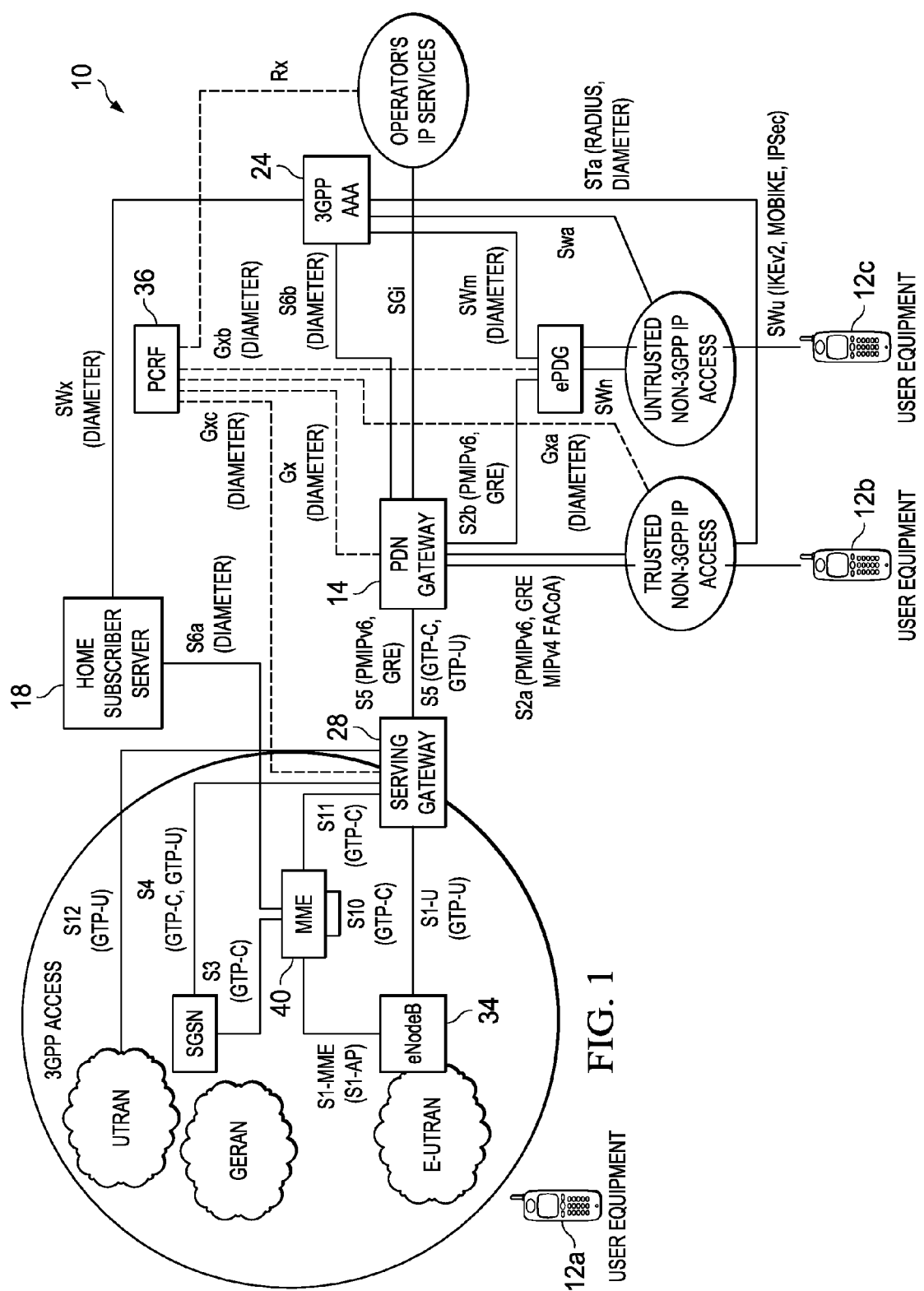
FIG. 1 is a simplified block diagram illustrating a communication system for managing tracking area identity lists in a mobile network environment according to one embodiment of the present disclosure.

Turning to FIG. 1, FIG. 1 is a simplified block diagram of a communication system 10 for managing tracking area identity lists in a mobile wireless network environment. This particular configuration may be tied to the 3rd Generation Partnership Project (3GPP) Evolved Packet System (EPS) architecture, also sometimes referred to as the Long-Term Evolution (LTE) EPS architecture, but alternatively this depicted architecture may be applicable to other environments equally. The example architecture of FIG. 1 includes multiple end users operating user equipment (UE) 12a-c and a packet data network (PDN) gateway (PGW) 14, which has a logical connection to a serving gateway (SGW) 28. Also provided is a home subscriber server (HSS) 18 and an Authentication, Authorization, and Accounting (AAA) element 24. SGW 28 has a logical connection to an eNodeB 34 and a Mobility Management Entity (MME) 40. Both SGW 28 and PGW 14 can interface with a Policy and Charging Rules Function (PCRF) 36.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs.

Also provided in the architecture of FIG. 1 is a series of interfaces, which can offer mobility, policy control, AAA functions, and charging activities for various network elements. For example, interfaces can be used to exchange point of attachment, location, and access data for one or more end users. Resource, accounting, location, access network information, network address translation (NAT) control, etc. can be exchanged using a remote authentication dial in user service (RADIUS) protocol, or any other suitable protocol where appropriate. Other protocols to be used in such communications can include Diameter, service gateway interface (SGi), terminal access controller access-control system (TACACS), TACACS+, etc.

There are two access cases represented in FIG. 1, which depicts these as trusted and untrusted non-3GPP IP access.

For the trusted scenario, a viable relationship exists between the service provider and the core network. For the untrusted scenario, a suitable security mechanism can be provided to ensure the integrity of the data communications (e.g., encryption and decryption operations can occur in this scenario and, further, involve an evolved packet data gateway (ePDG), which has a logical connection to PCRF 36 as shown in FIG. 1).

In more general terms, 3GPP defines the Evolved Packet System (EPS) as specified in TS 23.401, TS.23.402, TS 23.203, etc. The EPS generally consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks is done via the ePDG, which provides for IPsec security associations to the user equipment over the untrusted IP access network. The ePDG (in turn) supports mobility, policy, and AAA interfaces to the EPC, similar to the trusted IP access networks.

Before detailing the operations and the infrastructure of FIG. 1, certain contextual information is provided to offer an overview of some problems that may be encountered while managing radio resources in a mobile wireless network environment. Such information is offered earnestly and for teaching purposes only and, therefore, should not be construed in any way to limit the broad applications for the present disclosure.

When the UE attaches to an access network, it should be assigned a list of tracking area identities (TAIs). The UE can be mobile within these TAIs without updating the MME. If the UE moves to a TAI that is not within the assigned TAI list, the UE sends a Tracking Area Update (TAU) message to the MME, which triggers an SGW relocation. The data path from the UE to the network commonly is through an eNodeB and an SGW. An SGW can serve a set of TAIs. Selection of a TAI list for a UE is an MME function usually. The MME can ensure that all the TAIs in the TAI list are served by the selected SGW, as specified in TS 23.401. Domain Name Service (DNS) procedures provide a mechanism for finding an SGW that serves a particular TAI, but there is no such mechanism for reverse mapping. Thus, there is currently no viable strategy for computing a list of TAIs that an SGW supports. Consequently, if an SGW fails while supporting a call, the MME detaches the UE.

Choosing another SGW that supports the current UE TAI is not sufficient since the UE could move to a TAI that is not supported by the new SGW without sending a TAU to the MME (e.g., if the UE moves to a new TAI that is in its current TAI list). Hence, a TAI-to-SGW mapping may be available using DNS, but the list of TAIs that an SGW supports is not readily available. The MME should cache DNS responses for multiple TAIs, identify which SGW is common in response to multiple queries, and suitably manage this list. Separately, any TAI list that the MME assigns to the UE should be served by the selected SGW.

Logistically, when an SGW fails in existing architectures, an MME detects this event. The MME is forced to detach the UEs that are supported by the failed SGW. Without the cached and processed DNS query result, the most that an MME could do is to select an SGW that supports the current TAI of the UE; however, the MME has no mechanism for changing the UE tracking area list. Having the cached and processed DNS query result, but not having the SGW serving area grouping, the MME could attempt to find an SGW that supports all the TAIs currently assigned to the UE. This would be processing intensive and, furthermore, there is no mechanism to ensure that another SGW could be found.

In accordance with one embodiment, communication system 10 can overcome the aforementioned shortcomings (and others) by providing TAI list management based on SGW serving areas. When an eNodeB sends a setup request to an MME, and the MME accepts this request, the MME can send DNS queries for all the TAIs that are supported by the new eNodeB, but that currently have no cached DNS response. Note that some TAIs could have been queried in the context of processing setup requests from another eNodeB because multiple eNodeBs can service the same TAI. By processing the DNS responses, the MME can build sets of SGWs that serve common TAIs. In some embodiments, an SGW can belong to multiple sets, but the SGWs that belong to the same set can serve the same TAIs. A TAI may be an element in exactly one SGW set.

In operation, MME 40 can learn the serving areas of an SGW using DNS operations. MME 40 is configured to construct sets or groups of SGWs that serve common TAIs. Such groups of SGWs are included in an "SGW serving area." According to one embodiment, a TAI belongs to exactly one SGW serving area, where all TAIs belonging to an SGW serving area are served by the SGWs that belong to it, and an SGW may be part of multiple SGW serving areas. Similarly, eNodeBs that serve the same TAIs may be grouped together. Such a group of eNodeBs is referred to herein as an "eNodeB group."

When the SGW serving area solution is used, the MME can choose any SGW in the same SGW serving area. To relocate a UE in the ECM_IDLE state, the MME should create a session in the new SGW for each PDN to which the UE is attached. Similarly, to relocate a UE in the ECM_CONNECTED state, the MME should create a session in the new SGW for each PDN to which the UE is attached and, subsequently, move the UE to an idle state by releasing the UE eNB context. The UE can then send a Service Request to start using the network.

If the TAI list that is assigned to a UE is limited to TAIs within the same SGW serving area, and the SGW serving a particular UE fails, then the MME can relocate the UE to one of the other SGWs in the SGW serving area. The term 'relocate' is inclusive of operations associated with provisioning, allocating, distributing, or otherwise managing the network resources. To do SGW relocation if an SGW fails, all the TAIs in the TAI list assigned to the UE should be supported by the new SGW.

Constructing SGW serving areas and allocating TAI lists based such elements enables the MME to relocate the call to another SGW within the SGW serving area without having to check if all the TAIs are supported by the new SGW. Thus, failure of an SGW could be handled similar to an SGW relocation, which avoids the paging of idle UEs, the detaching UEs, and the reattaching UEs. This could minimize interactions with network elements and, further, conserve resources of the radio network. It also allows the UEs to remain attached to the EPS network if an SGW fails.

Note that in certain embodiments, the number of TAIs in a list may be limited to sixteen, which is the maximum amount that currently can be assigned in NAS messaging. The number of TAIs in a list is configurable and, therefore, can vary considerably from an operational perspective. In a particular example, the number of SGWs to be deployed for the logical area covered by the TAIs in a list would be operator dependent. In one instance, at least two could be deployed for load balancing/geographical redundancy purposes. Additional details relating to the operational capabilities of communication system 10 are provided below. Before turning to those capabilities and additional features, the infrastructure of FIG. 1 is discussed.

Returning to FIG. 1, UE 12a-c can be associated with clients or customers wishing to initiate a flow in communication system 10 via some network. The terms 'user equipment', 'mobile node', 'end user', 'and 'subscriber' are inclusive of devices used to initiate a communication, such as a computer, a personal digital assistant (PDA), a laptop or electronic notebook, a cellular telephone, an i-Phone, i-Pad, a Google Droid phone, an IP phone, or any other device, component, element, or object capable of initiating voice, audio, video, media, or data exchanges within communication system 10. UE 12a-c may also be inclusive of a suitable interface to the human user such as a microphone, a display, a keyboard, or other terminal equipment. UE 12a-c may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12a-c have a bundled subscription for network access and application services (e.g., voice), etc. Once the access session is established, the user can register for application services as well, without additional authentication requirements. There can be two different user data repositories (AAA databases): one for the access user profile and one for the application user profile. IP addresses can be assigned using dynamic host configuration protocol (DHCP), Stateless Address Auto-configuration, default bearer activation, etc., or any suitable variation thereof.

PCRF 36 is a network element responsible for coordinating charging and/or policy decisions for UE 12a-c. PCRF 36 can be configured to use subscription information as a basis for the policy and charging control decisions. The subscription information may apply for both session-based and non-session based services. PCRF 36 can maintain session linking to the sessions via policy interactions with PGW 14 (and possibly SGW 28) and application functions (e.g., provided as part of the operator's IP services). An application function (AF) can be provided within PCRF 36 (or simply interact with PCRF 36) in order to offer applications that require dynamic policy and/or charging control. The AF can communicate with PCRF 36 to transfer dynamic session information. Additionally, any type of policy and/or charging control element (e.g., PCC infrastructure) can be provided within (or suitably interact with) PCRF 36.

HSS 18 offers a subscriber database in 3GPP (e.g., GSM, LTE, etc.) environments. In one sense, HSS 18 can provide functions similar to those offered by an AAA server in a CDMA environment. When a user moves to 3GPP access, HSS 18 can be aware of this location and this anchor point (i.e., PGW 14). Additionally, HSS 18 can communicate with AAA element 24 such that when a UE moves to a CDMA environment, it still has an effective anchor for communications (i.e., PGW 14). HSS 18 and AAA element 24 can coordinate this state information for the UE (and synchronize this information) to achieve mobility. No matter how a UE moves, the access network element can be interacting with either HSS 18 or AAA element 24 in order to identify which PGW should receive the appropriate signaling. The route to a UE can be consistently maintained, where routing topology ensures that data is sent to the correct IP address. Thus, synchronization activity on the backend of the architecture allows mobility to be achieved for the user when operating in different environments. Additionally, in certain examples, PGW 14 performs home agent functions, and the trusted non-3GPP IP access network can provide packet data serving node (PDSN) functions in order to achieve these objectives.

AAA element 24 is a network element responsible for accounting, authorization, and authentication functions for UEs 12a-c. For the AAA considerations, AAA element 24 may provide the mobile node IP address and the accounting session identification (Acct-Session-ID) and other mobile node states in appropriate messaging (e.g., via an access-Request/access-Accept message). An accounting message can be sent for the following events: accounting-start when the IP session is initially created for the mobile node on the gateway; accounting-interim-update when a handover occurred between gateways; and an accounting-stop when the IP session is removed from the gateway serving the element. For roaming scenarios, the home routed case is fully supported by the architecture.

The EPC generally comprises an MME, an SGW, a PGW, and a PCRF. The MME is the primary control element for the EPC. Among other things, the MME provides tracking area list management, idle mode UE tracking, bearer activation and deactivation, SGW and PGW selection for UEs, and authentication services. The SGW is a data plane element that can manage user mobility and interfaces with Radio Access Networks. The SGW also maintains the data paths between eNodeBs and the PGW, and serves as a mobility anchor when UEs move across areas served by different eNodeBs. The PGW provides connectivity for UEs to external packet data networks. The PCRF detects service flows and enforces charging policies.

Radio Access Networks (RANs) in an EPS architecture consist of eNodeBs (also known as eNBs). An eNodeB is generally connected directly to an EPC, as well as to adjacent eNodeBs. Connections with adjacent eNodeBs allow many calls to be routed more directly, often with minimal or no interaction with an EPC. An eNodeB is also responsible for selecting an MME for UEs, managing radio resources, and making handover decisions for UEs.

In operation, UE 12a can attach to the network for purposes of establishing a communication session. UE 12a can communicate with eNodeB 34, which can further interact with MME 40 to complete some form of authentication for a particular user. MME 40 can interact with SGW 28, which interacts with PGW 14 such that a session is being setup between these components. Tunnels could be established at this juncture, and a suitable IP address would also be issued for this particular user. This process generally involves a default EPS bearer being created for UE 12a. As the session is established, PGW 14 can interact with PCRF 36 to identify policies associated with this particular user, such as a certain QoS setting, bandwidth parameter, latency setting, priority, billing, etc.

Figure 2:
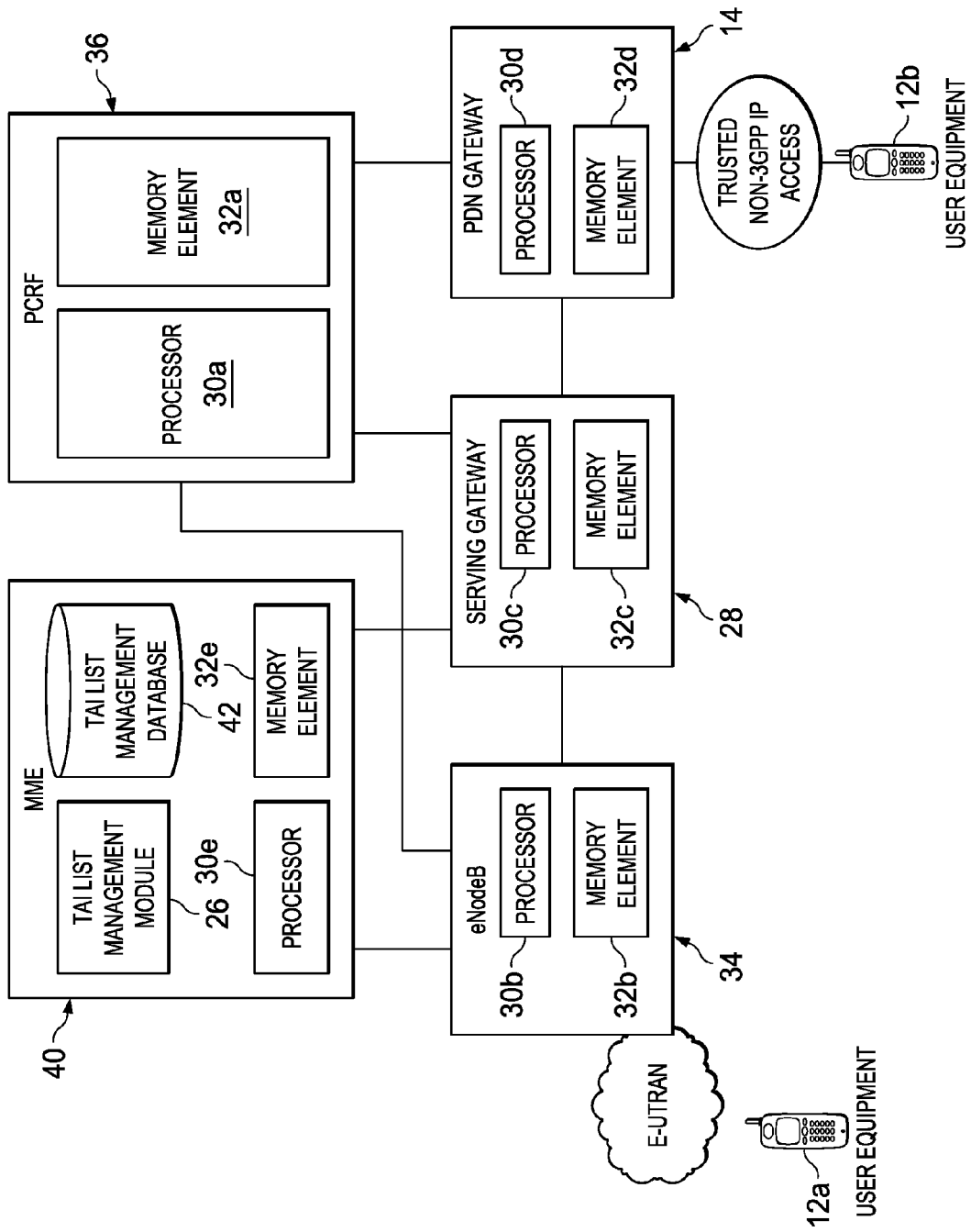
FIG. 2 is a simplified block diagram illustrating additional details associated with one potential embodiment of the communication system.

Turning to FIG. 2, FIG. 2 is a simplified block diagram illustrating additional details associated with one potential embodiment of communication system 10. FIG. 2 includes PGW 14, SGW 28, eNodeB 34, PCRF 36, and MME 40. Each of these elements includes a respective processor 30a-e and a respective memory element 32a-e. MME 40 also includes a TAI list management module 26 and a TAI list management database 42 in this particular example. Hence, appropriate software and/or hardware is being provisioned in MME 40 in order to facilitate the TAI list management activities discussed herein. Alternatively, such a mechanism can be provisioned in any of the other elements of FIGS. 1-2. Such provisioning may be based on particular operator constraints, particular networking environments, or specific protocol parameters. Note that in certain examples, TAI list management database 42 can be consolidated with memory elements (or vice versa), or the storage can overlap/exist in any other suitable manner. Also depicted in FIG. 2 is UE 12*a-b*, where these devices can attach to respective networks in order to conduct their communication sessions.

In one example implementation, PGW 14, SGW 28, eNodeB 34, and/or MME 40 are network elements, which are meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In regards to the internal structure associated with communication system 10, each of PGW 14, SGW 28, eNodeB 34, and/or MME 40 can include memory elements (as shown in FIG. 2) for storing information to be used in achieving the TAI list management operations, as outlined herein. Additionally, each of these devices may include a processor that can execute software or an algorithm to perform the TAI list management activities discussed herein. These devices may further keep information in any suitable memory element [(e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element.' The information being tracked or sent by PGW 14, SGW 28, eNodeB 34, and/or MME 40 could be provided in any database, queue, register, control list, or storage structure, all of which can be referenced at any suitable timeframe. Any such storage options may be included within the broad term 'memory element' as used herein. Similarly, any of the potential processing elements, modules, and machines described herein should be construed as being encompassed within the broad term 'processor.' Each of the network elements and user equipment (e.g., mobile nodes) can also include suitable interfaces for receiving, transmitting, and/or otherwise communicating data or information in a network environment.

In one example implementation, PGW 14, SGW 28, eNodeB 34, and/or MME 40 include software (e.g., as part of TAI list management module 26, etc.) to achieve, or to foster, the TAI list management operations, as outlined herein. In other embodiments, this feature may be provided externally to these elements, or included in some other network device to achieve this intended functionality. Alternatively, these elements include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Note that in certain example implementations, the TAI list management functions outlined herein may be implemented by logic encoded in one or more tangible media (e.g., embedded logic provided in an ASIC, in DSP instructions, software [potentially inclusive of object code and source code] to be executed by a processor, or other similar machine, etc.). In some of these instances, memory elements [as shown in FIG. 2] can store data used for the operations described herein. This includes the memory elements being able to store software, logic, code, or processor instructions that are executed to carry out the activities described herein. A processor can execute any type of instructions associated with the data to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Figure 3:
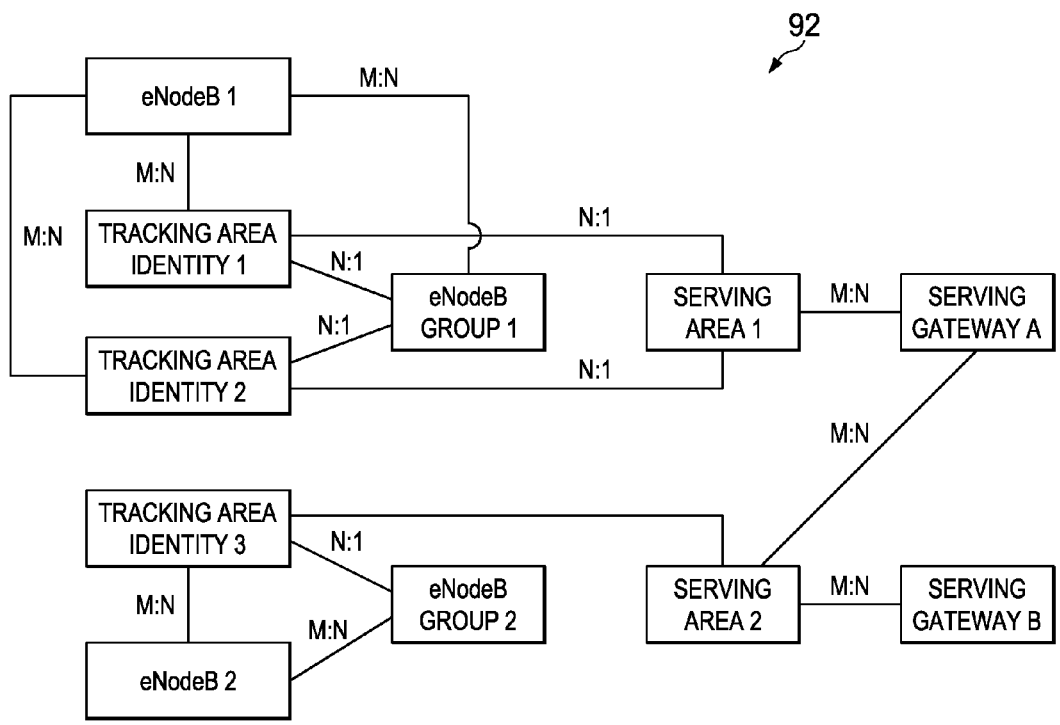
FIG. 3 is a simplified block diagram illustrating one possible set of details associated with a list management database in one embodiment of the communication system.

Turning to FIG. 3, FIG. 3 is a simplified block diagram illustrating an example configuration 92 associated with TAI list management module 40 and TAI list management database 42. FIG. 3 shows the relationships between certain elements in one embodiment of TAI list management database 42. For example, TAI list management database 42 may store information about serving gateway A and serving gateway B, which may have an M:N relationship to serving area 1 and to serving area 2. Serving area 1 and serving area 2, in turn, can be each associated with N TAIs. In the example of FIG. 3, serving area 1 is associated with TAI 1 and TAI 2, while serving area 2 is associated with TAI 3. Each eNodeB can be associated with one or more TAIs such that, in FIG. 3, eNodeB 1 is associated with TAI 1 and TAI 2, and eNodeB 2 is associated with TAI 3. Each eNodeB can also be associated with an eNodeB group. An eNodeB group is a set of eNodeBs that serve the same TAIs. Thus, an eNodeB group may be characterized by a set of TAIs and a set of eNodeBs, where a TAI is in one eNodeB group. In FIG. 3, for example, eNodeB 1 serves both TAI 1 and TAI 2, so eNodeB 1, TAI 1, and TAI 2 are associated with eNodeB group 1. eNodeB 2 serves TAI 3, where both are associated with eNodeB group 2.

Certain network events may affect the information in TAI list management database 42. For example, DNS queries may be used for identifying an SGW that serves a TAI. The response to the DNS query can include a list of all SGWs that serve the TAI. The first time a DNS query response is received, the list of SGWs can be compared with existing SGW serving areas. If any of the existing SGW serving areas have the same list of SGWs as indicated in the DNS response, the TAI can be added to that SGW serving area. Otherwise, a new SGW serving area can be created and the TAI can be added to the new SGW serving area. The TAI list for the TAI that started the query can subsequently be calculated. If the response is a refresh, the current SGW serving area of the TAI may be checked to determine if the DNS response includes the same set of SGWs. If not, the TAI should be removed from the SGW serving area. TAI lists of the remaining TAIs in the old SGW serving area may then be determined. A new SGW serving area for the TAI can be determined as if it was the first DNS response. If the DNS response includes the same set of SGWs, then no further changes may be necessary.

Figure 4:
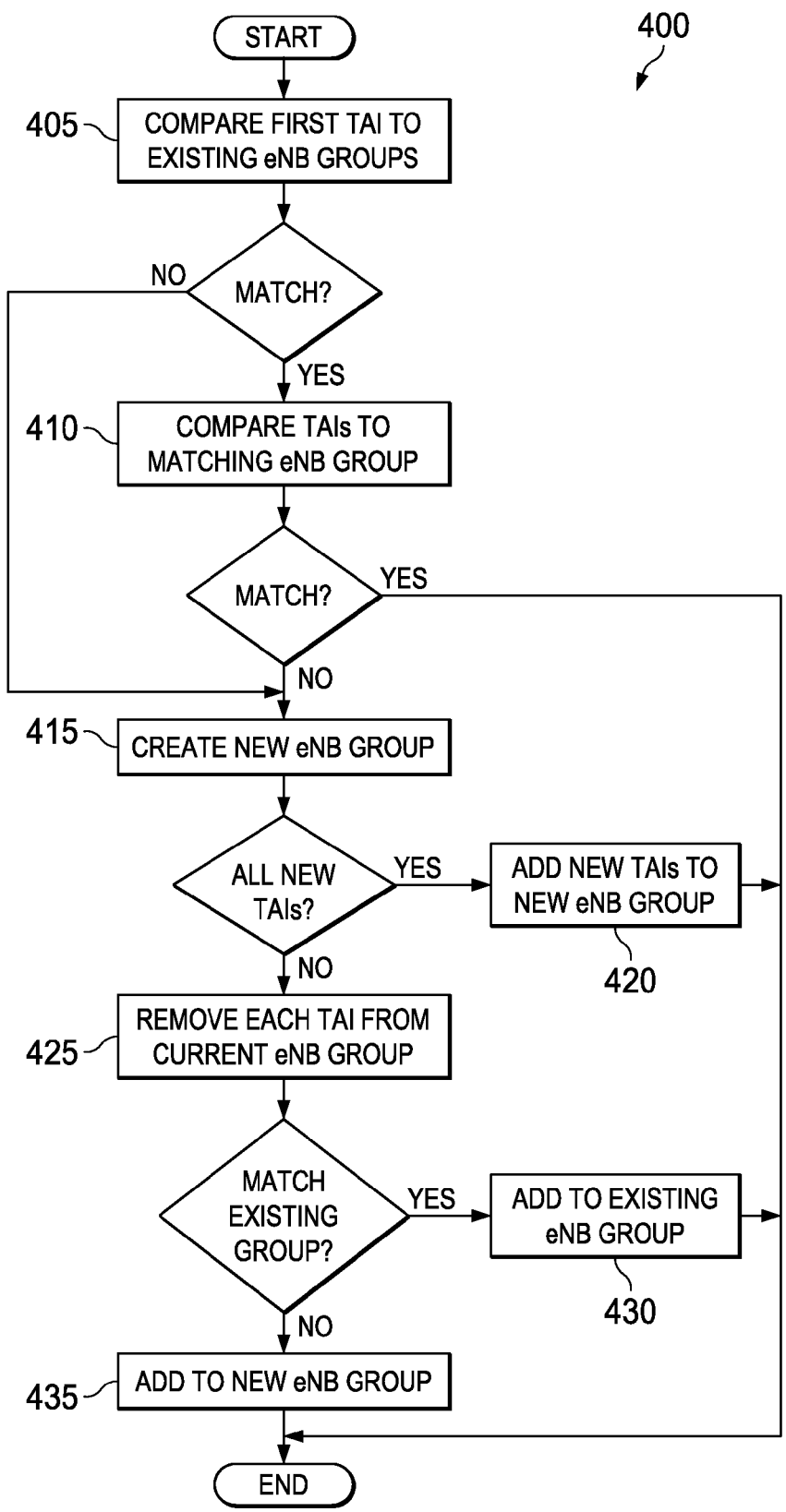
FIG. 4 is a simplified flowchart illustrating example operations associated with processing an eNodeB setup request in one embodiment of the communication system.

FIG. 4 is a simplified flowchart 400 illustrating example operations associated with processing an eNodeB setup request in one example operation of communication system 10. In one particular embodiment, these operations may be carried out by TAI list management module 26 in MME 40. At any time prior to a UE attaching to the network, an eNodeB can establish a connection with MME 40 using a setup request and response messages. In general, the eNodeB is configured to send a list of supported TAIs in the setup request message. Thus, processing starts when the list of TAIs is received. The first TAI in the list may be compared to existing eNodeB groups at 405. If a matching eNodeB group is found, then the remaining TAIs in the list can be compared with the TAI list of the matching eNodeB group at 410. If all of the TAIs in the eNodeB group are supported by the eNodeB sending the setup request, then no further processing may be required. If the TAI list of the eNodeB does not fit into any existing eNodeB group, a new eNodeB group can be created at 415. If all the TAIs that are supported by the eNodeB are new, then a new eNodeB group is created to include the eNodeB and its TAIs (indicated at 420), where no further processing is required. However, if at least one of the TAIs is already known, then for each TAI supported by the eNodeB, the TAI should be removed from its current eNodeB group at 425. If any other existing eNodeB group supports the exact list of eNodeBs as the removed TAI, then the TAI may be added to that eNodeB group at 430. If no such eNodeB group is found, a new eNodeB group can be created at 435, and the removed TAI can be added to the new group at 435.

Figure 5:
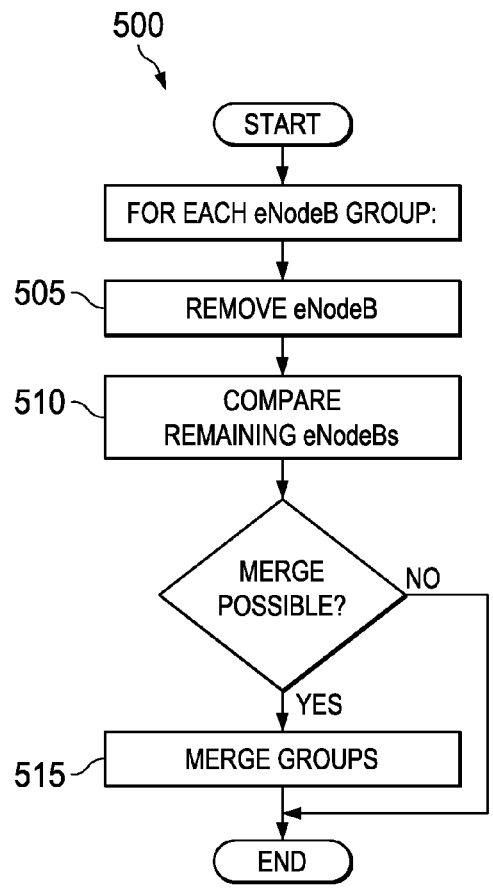
FIG. 5 is a simplified flowchart illustrating example operations associated with removing an eNodeB from a database in one embodiment of the communication system.

FIG. 5 is a simplified flowchart 500 illustrating example operations associated with removing an eNodeB from TAI list management database 42 in one embodiment of communication system 10. In one particular embodiment, these operations may be carried out by TAI list management module 26 in MME 40. Alternatively, such activities can be performed by any network element of communication system 10. For all of the eNodeB groups to which the eNodeB belongs, the eNodeB may be removed from the groups at 505. For each eNodeB group from which the eNodeB is removed, a determination is made if the group can be merged with another group (indicated at 510). For example, two eNodeB groups may be merged if they have the same set of eNodeBs in them. If the eNodeB group (from which the eNodeB has been removed) can possibly be merged with another group, it can be merged with the other group at 515.

The example operations illustrated in FIG. 4 and FIG. 5 may also be associated with processing an eNodeB configuration update request. In some scenarios, a configuration update may not include a TAI list, in which case no additional processing may be necessary. However, if the configuration update request results in an additional eNodeB, the request may be processed similar to that which is described above in FIG. 4. If the configuration update request results in the removal of an eNodeB, the request may be processed similarly to that which is described in FIG. 5.

In one embodiment of communication system 10, TAI lists assigned to a UE are linked lists into which TAIs may be inserted or removed. As noted above, all of the TAIs in such a list should be serviced by the same SGW. Moreover, additional criteria may make a TAI list more effective. For example, if all of the TAIs assigned to a UE are in the same SGW serving area, an MME may be better able to process an SGW failure by transferring calls to any of the other SGWs in the same SGW serving area. In another example, the number of eNodeBs that need to be paged in certain scenarios may be reduced, provided the number of eNodeB groups that is used to generate a TAI list is reduced.

Figure 6:
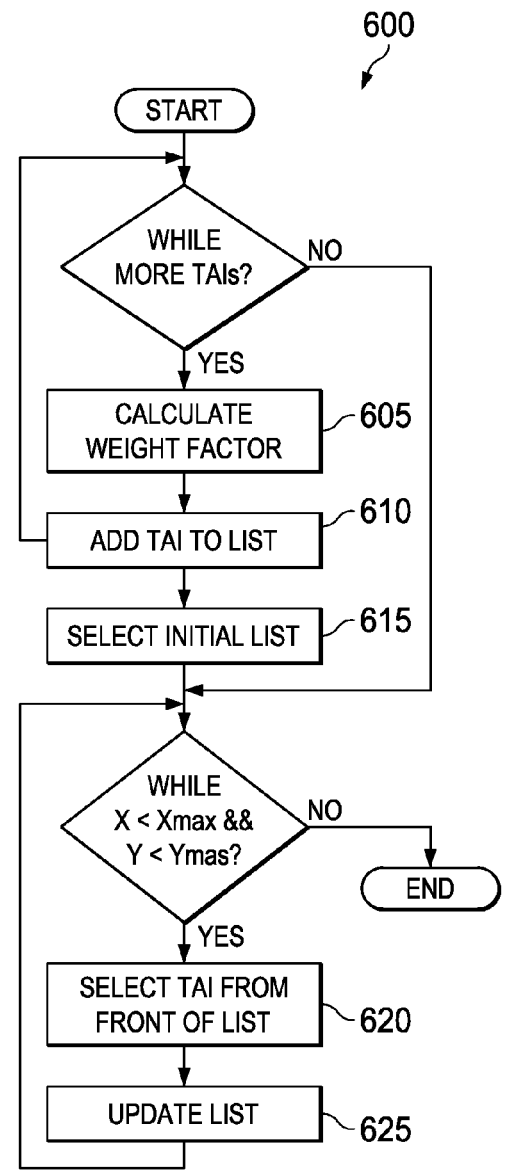
FIG. 6 is a simplified flowchart illustrating example operations associated with maintaining a linked list of tracking area identities for serving gateway serving areas in one embodiment of the communication system.

FIG. 6 is a simplified flowchart 600 illustrating example operations associated with maintaining a list of TAIs for a UE in one embodiment of communication system 10. In one particular embodiment, these operations may be carried out by TAI list management module 26 in MME 40. In this example embodiment, the linked list may be maintained based on increasing weights. For example, the weights may be the number of eNodeBs that are not in the eNodeB group of the UE's current TAI. Thus, as is depicted in FIG. 6, a weight factor for adding a TAI to a TAI list is calculated by comparing the eNodeB groups of the TAIs at 605 and, subsequently, adding it to a candidate pool of TAIs at 610. This operation is repeated for all the TAIs in the SGW serving area of the current TAI. The TAIs with a weight factor of zero are selected as the initial TAI list at 615. While the number of selected TAIs (X) is less than the maximum number of allowed TAIs (Xmax) and the total eNodeB count (Y) is less than the maximum allowed eNodeB count (Ymax), the TAI that is at the front of the list is selected at 620, and the rest of the list is updated at 625. The weights of the other elements in the list may change if new eNodeBs have been added.

The computation of a TAI list need not occur at each call instance. For example, the computation can be done when the information in TAI list management database 42 changes in a way that could affect the TAI list for a TAI. Certain events may trigger these changes, such as an eNodeB configuration update, or an S1 setup that changes the eNodeB group to which a TAI belongs, a DNS query result that changes the SGW pool to which the TAI belongs, or a configuration update that changes the SGW list that supports the TAI. Once a TAI list is computed, it can be assigned on a per-call basis.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures. Additionally, although described with reference to particular scenarios, where a TAI list management module is provided within the network elements, these modules can be provided externally, or consolidated and/or combined in any suitable fashion. In certain instances, a TAI list management module may be provided in a single proprietary unit.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    communicating a plurality of queries associated with common tracking areas in a wireless network;
    identifying a set of serving gateways that serve the common tracking areas;
    generating a tracking area identity (TAI) list to be used in provisioning network resources for user equipment, wherein the TAI list comprises the identified set of serving gateways that serve the common tracking areas; and
    selecting a first serving gateway from the set of serving gateways for the user equipment, wherein the first serving gateway is selected based on the common tracking areas served by the set of serving gateways.

2. The method of claim 1, wherein the queries are domain name system (DNS) queries that are supported by a network element and that have no cached DNS response.

3. The method of claim 1, further comprising:
    relocating the user equipment to a second serving gateway in the set of serving gateways without detaching the user equipment.

4. The method of claim 1, further comprising:
    relocating the user equipment to a second serving gateway in the set of serving gateways in response to a failure of the first serving gateway.

5. The method of claim 1, wherein a weight factor is calculated for each common tracking area, the weight factor being representative of a number of eNodeBs that are not in an eNodeB group of the user equipment's current tracking area identity (TAI).

6. The method of claim 5, wherein assigned tracking areas are determined by selecting the common tracking areas having lower weight factors.

7. The method of claim 1, further comprising:
    relocating the user equipment to a second serving gateway in the set of serving gateways without detaching the user equipment, wherein a number of particular tracking areas assigned to the user equipment is less than a preconfigured limit, and wherein a selected one of the particular tracking areas belongs to exactly one set of serving gateways.

8. Logic encoded in non-transitory media that includes code for execution and when executed by a processor operable to perform operations comprising:
    communicating a plurality of queries associated with common tracking areas in a wireless network;
    identifying a set of serving gateways that serve the common tracking areas;
    generating a tracking area identity (TAI) list to be used in provisioning network resources for user equipment, wherein the TAI list comprises the identified set of serving gateways that serve the common tracking areas; and
    selecting a first serving gateway from the set of serving gateways for the user equipment, wherein the first serving gateway is selected based on the common tracking areas served by the set of serving gateways.

9. The logic of claim 8, wherein the queries are domain name system (DNS) queries that are supported by a network element and that have no cached DNS response.

10. The logic of claim 8, wherein the operations further comprise:
    relocating the user equipment to a second serving gateway in the set of serving gateways without detaching the user equipment.

11. The logic of claim 8, wherein the operations further comprise:
    relocating the user equipment to a second serving gateway in the set of serving gateways in response to a failure of the first serving gateway.

12. The logic of claim 8, wherein a weight factor is calculated for each common tracking area, the weight factor being representative of a number of eNodeBs that are not in an eNodeB group of the user equipment's current tracking area identity (TAI).

13. The logic of claim 12, wherein assigned tracking areas are determined by selecting the common tracking areas having lower weight factors.

14. The logic of claim 8, wherein the operations further comprise:
    relocating the user equipment to a second serving gateway in the set of serving gateways without detaching the user equipment, wherein a number of particular tracking areas assigned to the user equipment is less than a preconfigured limit, and wherein a selected one of the particular tracking areas belongs to exactly one set of serving gateways.

15. An apparatus, comprising:
    a memory element configured to store electronic code;
    a processor operable to execute instructions associated with the electronic code; and
    a tracking area identity (TAI) module configured to interface with the processor such that the apparatus is configured for:
        communicating a plurality of queries associated with common tracking areas in a wireless network;
        identifying a set of serving gateways that serve the common tracking areas;
        generating a tracking area identity (TAI) list to be used in provisioning network resources for user equipment, wherein the TAI list comprises the identified set of serving gateways that serve the common tracking areas; and
        selecting a first serving gateway from the set of serving gateways for the user equipment, wherein the first serving gateway is selected based on the common tracking areas served by the set of serving gateways.

16. The apparatus of claim 15, wherein the queries are domain name system (DNS) queries that are supported by a network element and that have no cached DNS response.

17. The apparatus of claim 15, wherein the apparatus is further configured for:
    relocating the user equipment to a second serving gateway in the set of serving gateways without detaching the user equipment.

18. The apparatus of claim 15, wherein the apparatus is further configured for:

relocating the user equipment to a second serving gateway in the set of serving gateways in response to a failure of the first serving gateway.

19. The apparatus of claim 15, wherein a weight factor is calculated for each common tracking area, the weight factor being representative of a number of eNodeBs that are not in an eNodeB group of the user equipment's current tracking area identity (TAI), and wherein assigned tracking areas are determined by selecting the common tracking areas having lower weight factors.

20. The apparatus of claim 15, wherein the apparatus is further configured for:

relocating the user equipment to a second serving gateway in the set of serving gateways without detaching the user equipment, wherein a number of particular tracking areas assigned to the user equipment is less than a preconfigured limit, and wherein a selected one of the particular tracking areas belongs to exactly one set of serving gateways.

* * * * *